Sept. 8, 1931.    E. KRAEMER ET AL    1,822,154
PROTECTION AGAINST POISONOUS GASES
Filed Sept. 11, 1930

Patented Sept. 8, 1931

1,822,154

UNITED STATES PATENT OFFICE

ERNST KRAEMER, OF STUTTGART, AND KARL HÖRRMANN, OF ERNSTMUHL, NEAR HIRSAU, GERMANY

PROTECTION AGAINST POISONOUS GASES

Application filed September 11, 1930, Serial No. 481,204, and in Germany August 1, 1930.

This invention relates to a device for protecting soldiers and civilians in the case of gas attacks in future wars. The existing gas masks form only insufficient protection in view of the present day standing of the art of manufacturing poisonous gases and fail entirely with certain gases. In spite of the threatening danger of a gas war which may have unforseen results owing to the insufficient precautionary measures, no effective useful and absolutely reliable device exists at present for effectively dealing with this danger. The invention shows a protecting device in the shape of a double walled glass bell, the intermediate spaces of which are filled with a liquid, preferably with glycerine. This bell rests on a shaped glass plate at the bottom and is closed against the outer side by a liquid seal. Means which are adapted to be completely closed in the case of greatest danger, are provided in the roof for allowing the used air to pass off. The replenishing of the air is effected from steel cylinders containing highly compressed air, for example with a high percentage of oxygen. Further a container for foodstuffs and a tightly closable box for toilet purposes are provided, both of which can serve as seats. To enable the bell to be easily raised for entering, its weight is approximately balanced with counterweights.

Figure 1:
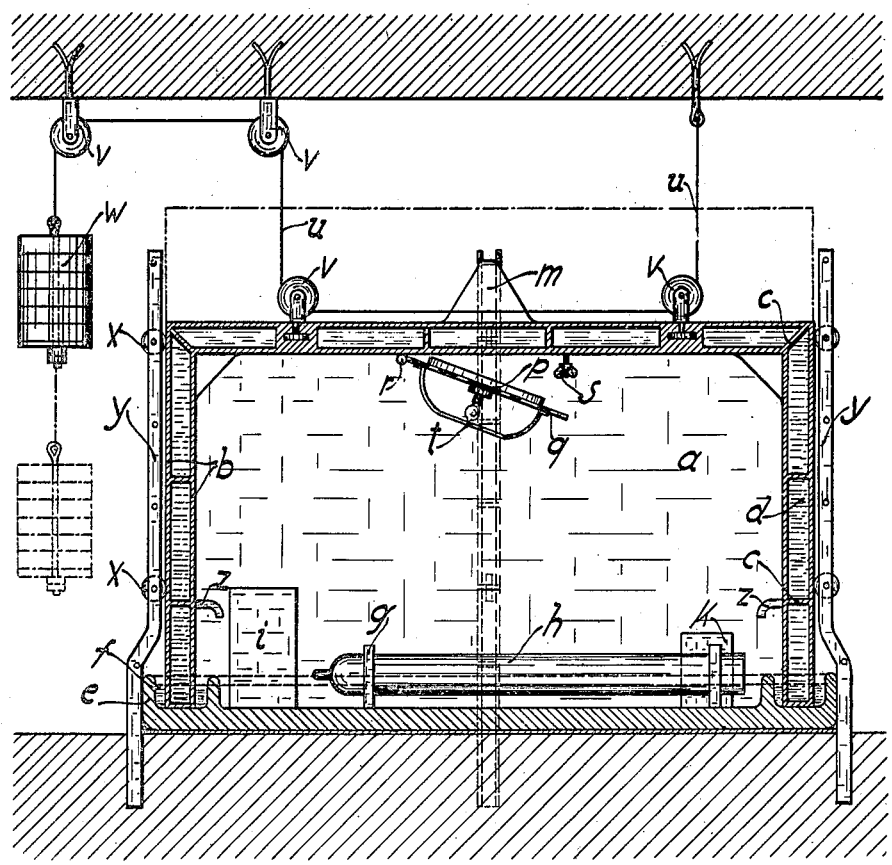
Figure 2:
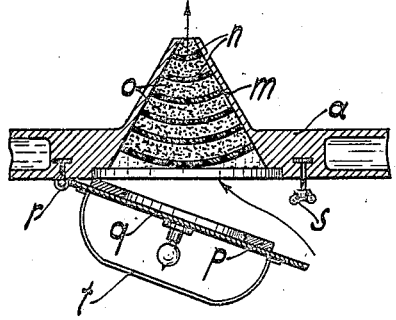

An embodiment of the invention is illustrated by way of example in the accompanying drawings, in which Fig. 1 shows the device in longitudinal section and Fig. 2 is a section through the air exhaust.

The protecting device consists of a bell $a$, which may be of rectangular, circular or oval cross section. The surrounding walls of the bell are made as double glass walls $b$, which are mutually held together by reinforcements $c$; the space between the double walls is filled with a liquid $d$, preferably with glycerine. This filling has for its object, to prevent gas from filtering from the outer side to the inner side through any possible porous points in the glass walls which points are otherwise tight against liquid. Naturally for cheaper construction solid, carefully tested simple glass wall will be sufficient. A strong, shaped glass plate $e$ is placed on the floor on a soft surface, such as a carpet or the like. A groove $f$ near the edge of the plate is filled with a liquid such as glycerine and forms the bearing for the glass bell $a$, the inner space of which is in this manner shut off absolutely gas-proof from the outside. The renewal of air in the bell is effected by means of steel cylinders $h$ arranged in stands $g$ on the glass plate $e$ and which, like a foodstuff store box $i$ and a box $k$ serving for toilet purposes, tightly closable and if desired surrounded with a wooden wall, can serve as seating accommodation. The used air is discharged through an upwardly tapering conical aperture $m$ arranged in the roof, which aperture accommodates a plurality of sieve like perforated plates $n$, the spaces between said plates being filled with any of the usual gas absorbing masses $o$, which can be renewed. The air, which always has a slight overpressure in the bell, can escape slowly and uniformly through the sieves and the porous filling, in proportion to the admission of fresh air with high percentage of oxygen from the cylinders $h$. During the time of the greatest danger the aperture $m$ can be tightly closed by a flap $q$ provided with rubber packing $p$, oscillatably mounted on a hinge $r$ and adapted to tilt into the position shown, the flap $q$ being pressed against the roof with the aid of the wing nuts $s$. The under side of the flap $q$ may further be provided with a glass globe $t$ adapted to accommodate an incandescent bulb supplied from a dry battery. For the purpose of raising for entering, the bell is suspended on a rope $u$ running over the pulleys $v$ and carrying a counterweight $w$, which partly balances the weight of the bell. The vertical guiding of the bell is effected by uprights $y$ provided with rollers $x$.

For use the bell is raised and, after entering, is again pressed down from the inside by means of the handles $z$, and when the danger has passed, it can be again raised also from the inside.

In the case of small constructions the guide rails may be omitted and the bell simply tilted into an inclined position by a rope on one side.

With the aid of this device, which may be constructed in all sizes, for example for a family, for an entire house or a block of houses and which can also be used on the battle field in bullet-proof dug-outs or in railway carriages, the danger of a gas war can be effectively dealt with and many valuable lives saved.

We claim:—

1. A protecting device against poisonous gases, comprising in combination a double walled glass bell having a liquid filled into the hollow walls, a glass plate having a groove filled with liquid adapted to support said glass bell, an air discharge in the top portion of said bell, means for tightly closing said air discharge, a rope adapted to raise said bell, and a counter-weight on said rope adapted to facilitate the raising of said bell.

2. In a protecting device as specified in claim 1, an air discharge comprising in combination an inverted funnel, a plurality of sieves inserted in said funnel, a poisonous gas absorbing insert between said sieves adapted to allow a slow and uniform escapement of the used air to be renewed, and a cover adapted to air-tightly close said funnel in the case of greatest danger.

In testimony whereof we affix our signatures.

ERNST KRAEMER.
KARL HÖRRMANN.